US010277462B1

(12) United States Patent
Cohen

(10) Patent No.: US 10,277,462 B1
(45) Date of Patent: Apr. 30, 2019

(54) SYSTEM, METHOD, AND COMPUTER PROGRAM FOR MAINTAINING VERSIONING OF WEB SERVICES ASSOCIATED WITH A PLURALITY OF INDEPENDENT SUB-ORGANIZATIONS

(71) Applicant: Amdocs Development Limited, Limassol (CY)

(72) Inventor: Yossi Cohen, Hod-Hasharon (IL)

(73) Assignee: AMDOCS DEVELOPMENT LIMITED, Limassol (CY)

(*) Notice: Subject to any disclaimer, the term of this patent is extended or adjusted under 35 U.S.C. 154(b) by 223 days.

(21) Appl. No.: 15/247,768

(22) Filed: Aug. 25, 2016

Related U.S. Application Data

(60) Provisional application No. 62/209,803, filed on Aug. 25, 2015.

(51) Int. Cl.
*G06F 15/177* (2006.01)
*H04L 12/24* (2006.01)
*H04L 29/08* (2006.01)

(52) U.S. Cl.
CPC ...... *H04L 41/0873* (2013.01); *H04L 41/0859* (2013.01); *H04L 67/02* (2013.01)

(58) Field of Classification Search
CPC ............. H04L 41/0246; H04L 41/0869; H04L 41/5041; H04L 41/0816; H04L 51/046; H04L 67/02; H04L 67/34
USPC .................................................. 709/220, 221
See application file for complete search history.

(56) References Cited

U.S. PATENT DOCUMENTS

| 7,380,003 | B1 | 5/2008 | Guo et al. |
| 7,610,316 | B2 | 10/2009 | Bartz et al. |
| 7,720,800 | B2 | 5/2010 | Fang et al. |
| 7,954,085 | B2 | 5/2011 | Colgrave |

(Continued)

FOREIGN PATENT DOCUMENTS

| CN | 103440337 A | 12/2013 |
| CN | 103473100 A | 12/2013 |

*Primary Examiner* — Wing F Chan
*Assistant Examiner* — Andrew Woo
(74) *Attorney, Agent, or Firm* — Zilka-Kotab, P.C.

(57) ABSTRACT

A system, method, and computer program product are provided for maintaining versioning of web services and XML (Extensible Markup Language) schemas associated with a plurality of independent sub-organizations. In use, a versioning history of a plurality of web services is tracked across a plurality of sub-organizations associated with an organization. Further, a new version of a web service to be introduced in at least one of the sub-organizations is identified. Additionally, a baseline web service version to use for the new version of the web service is automatically identified based on a tracked versioning history of the web service. Furthermore, an existing state of WSDL (Web Services Definition Language) documents and XSD (XML Schema Definition) documents is validated to ensure compliance with a dependency scheme associated with the tracked versioning history of the web service. Moreover, the baseline web service version and dependencies to use for the new version of the web service is recommended to a user, and an impact of introducing the new version of the web service is indicated, such that consistency of the versioning history of the plurality of web services across the plurality of sub-organizations is capable of being maintained.

15 Claims, 10 Drawing Sheets

(56) References Cited

U.S. PATENT DOCUMENTS

| | | |
|---|---|---|
| 8,352,968 B2 | 1/2013 | Ahmed et al. |
| 8,539,475 B2 | 9/2013 | Ershov |
| 8,805,971 B1 * | 8/2014 | Roth .................... G06F 9/5072 |
| | | 709/203 |
| 2006/0155725 A1 | 7/2006 | Foster et al. |
| 2012/0110093 A1 | 5/2012 | Tingstrom et al. |
| 2013/0086627 A1 | 4/2013 | Bryan et al. |
| 2014/0068639 A1 | 3/2014 | Schrock et al. |
| 2014/0366011 A1 | 12/2014 | Rector et al. |
| 2015/0143355 A1 * | 5/2015 | Tingstrom ................ G06F 8/65 |
| | | 717/170 |

* cited by examiner

```
@Documentation("" + "New and updated types for v2 operations.\n")
@RepositoryTypes(organizationLevel = OrganizationLevel1.Comp_1
    ,organizationLevel2 = OrganizationLevel2.sub_org_1_1
    ,organizationLevel3 = OrganizationLevel3.sub_org_1_2
    ,category = TypeCategory.DOMAIN
    ,functionalDomain = FunctionalDomain.BILLINGACCOUNTMANAGEMENT
    ,version = 2    // The version to be encoded in the namespace of the
                    //   generated XML schema; The @XmlSchema annotation must
                    //   conform to the values specified by this annotation and that
                    //   includes the 'version'
    ,wbpVersion = 1)
@XmlAccessorOrder(XmlAccessOrder.ALPHABETICAL)
@XmlAccessorType(XmlAccessType.FIELD)
@XmlSchema(namespace = "http://comp1/sub_org_1_1-sub_org_1_2/billingaccountmanagement/types/v2",
    elementFormDefault=XmlNsForm.QUALIFIED)
package com.comp_1.sub_org_1_1.sub_org_1_2.types.v2.billingaccountmanagement;  // package-
info.java
...
```

FIGURE 4

| Dependent | Depends On | | | |
|---|---|---|---|---|
|  | Core* | Functional Domain Common | Functional Domain | Service |
| Core* | ◐ → | → | → |  |
| Functional Domain Common |  | ◐ ◐ → | → |  |
| Functional Domain |  |  | ◐ ◐ ◐ → |  |
| Service |  |  |  | ◐ ◐ ◐ ◐ |

SYSTEM, METHOD, AND COMPUTER PROGRAM FOR MAINTAINING VERSIONING OF WEB SERVICES ASSOCIATED WITH A PLURALITY OF INDEPENDENT SUB-ORGANIZATIONS

CLAIM OF PRIORITY

This application claims the benefit of U.S. Provisional Application No. 62/209,803, filed Aug. 25, 2015, the entire contents of which are incorporated herein by reference.

FIELD OF THE INVENTION

The present invention relates to maintaining web service versions across various organizations.

BACKGROUND

In a large organization, web service versioning is processed in a decentralized manner within quite independent sub-organizations. Each sub-organization may either introduce a new web service or introduce a new web service version that is based on an existing version, which is called a baseline-namespace. Since the baseline-namespace is evolved independently by a different sub-organization, eventually that sub-organization may also introduce a new version for the baseline-namespace. This may potentially lead to having inconsistent evolution for the same web service.

There is thus a need for addressing these and/or other issues associated with the prior art.

SUMMARY

A system, method, and computer program product are provided for maintaining versioning of web services and XML (Extensible Markup Language) schemas associated with a plurality of independent sub-organizations. In use, a versioning history of a plurality of web services is tracked across a plurality of sub-organizations associated with an organization. Further, a new version of a web service to be introduced in at least one of the sub-organizations is identified. Additionally, a baseline web service version to use for the new version of the web service is automatically identified based on a tracked versioning history of the web service. Furthermore, an existing state of WSDL (Web Services Definition Language) documents and XSD (XML Schema Definition) documents is validated to ensure compliance with a dependency scheme associated with the tracked versioning history of the web service. Moreover, the baseline web service version and dependencies to use for the new version of the web service is recommended to a user, and an impact of introducing the new version of the web service is indicated, such that consistency of the versioning history of the plurality of web services across the plurality of sub-organizations is capable of being maintained.

BRIEF DESCRIPTION OF THE DRAWINGS

FIG. 4 illustrates an example of Java metadata package information, in accordance with one embodiment.

FIG. 6 illustrates an example of a dependency scheme, in accordance with one embodiment.

Figure 8:
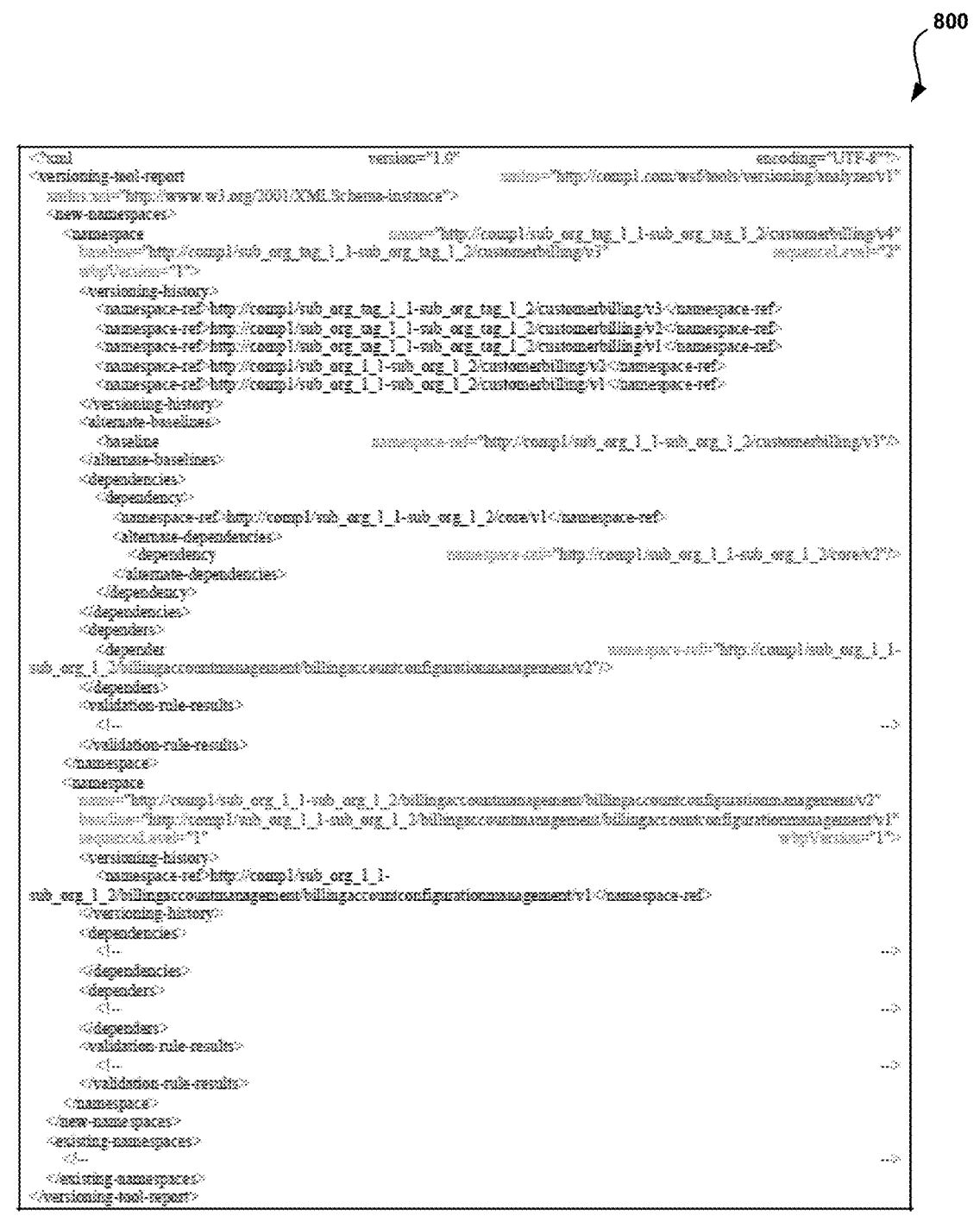

FIG. 8 illustrates an example of a versioning analyzer report, in accordance with one embodiment.

DETAILED DESCRIPTION

Figure 1:
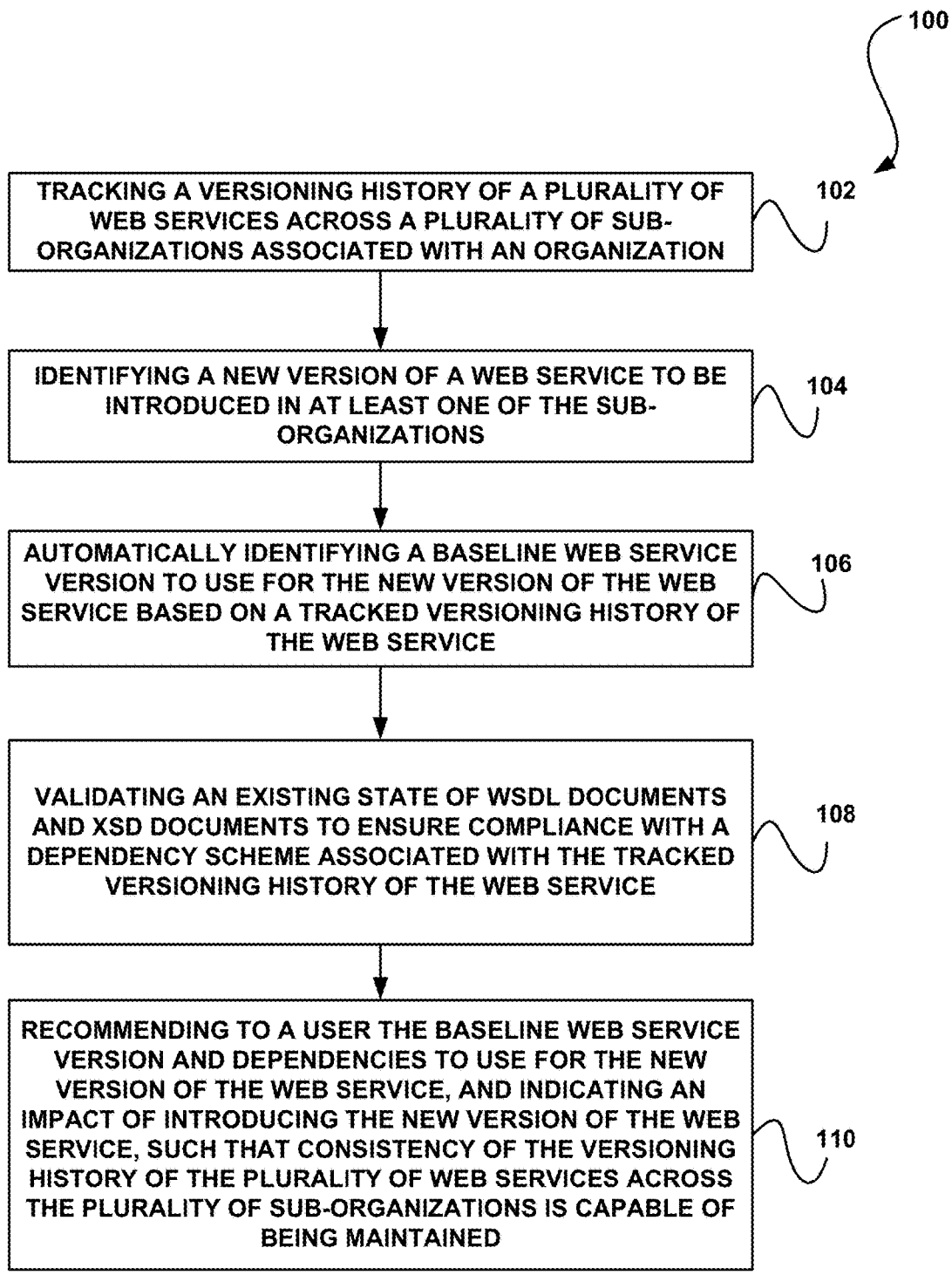
FIG. 1 illustrates a method for maintaining versioning of web services and XML (Extensible Markup Language) schemas associated with a plurality of independent sub-organizations, in accordance with one embodiment.

FIG. 1 illustrates a method 100 for maintaining versioning of web services and XML (Extensible Markup Language) schemas associated with a plurality of independent sub-organizations, in accordance with one embodiment.

As shown, a versioning history of a plurality of web services is tracked across a plurality of sub-organizations associated with an organization. See operation 102. The plurality of sub-organizations associated with the organization may include a plurality of separate decentralized sub-organizations. The organization may be associated with any type of business. For example, the organization may be associated with a communication service provider (CSP), etc.

Further, a new version of a web service to be introduced in at least one of the sub-organizations is identified. See operation 104. The new version of the web service may be associated with updated WSDL schema and/or updated XML (Extensible Markup Language) schema.

In the context of the present description, a web service refers to any service offered by an electronic device to another electronic device, communicating with each other via at least one network. The new version of the web service may be a new version of an existing web service or a completely new web service (or portion thereof).

Additionally, a baseline web service version to use for the new version of the web service is automatically identified based on a tracked versioning history of the web service. See operation 106.

Furthermore, an existing state of WSDL (Web Services Definition Language) documents and XSD (XML Schema Definition) documents is validated to ensure compliance with a dependency scheme associated with the tracked versioning history of the web service. See operation 108. In this case, each of the WSDL documents and the XSD documents may be associated with a namespace. Additionally, a version identifier may be associated with each namespace. Thus, the version identifier may be used to identify versions associated with the WSDL documents and the XSD documents.

Moreover, the baseline web service version and dependencies to use for the new version of the web service is recommended to a user, and an impact of introducing the new version of the web service is indicated, such that consistency of the versioning history of the plurality of web services across the plurality of sub-organizations is capable of being maintained. See operation 110. In this case, recommending the baseline web service version and dependencies to use for the new version of the web service may include displaying at least one recommendation utilizing at least one user interface.

It should be noted that the method 100 may be implemented utilizing various systems, hardware (e.g. processors, etc.), software, applications, user interfaces, etc., as dictated by the implementer. More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

As opposed to pursuing initial perfection, the web service versioning described herein enables evolutionary refinement. Such techniques may be used to accommodate rapidly changing business requirements while keeping the older web service versions intact.

The techniques and systems described herein offer a framework and a corresponding methodology that manage web service versions. The framework reduces the complexity usually involved in managing such technical assets. The framework includes a set of reactive tools that validate the existing state of WSDL and XSD documents. The tools ensure these documents comply with the dependency scheme and other rules that intend to ease versioning. The framework also includes a set of proactive tools that advise the user on what baseline they should use for new web service versions, what the impact is, and what it means to adopt these new versions.

When introducing a new version of a web service (WSDL and/or XML schema), all the dependers need to be considered, which are versioned web services by themselves. When a web service or XML schema updates its dependencies to newer versions, it has to be versioned by itself to avoid backward incompatible changes. The magnitude of the impact varies depending on the dependencies that are implemented into web services. For example, adopting a new version of XML schema with many XML schema dependers requires more effort compared to a new version of XML schema with a single XML schema depender.

The platform, referred to herein as a web service factory (WSF), introduces the dependency scheme to control the dependencies and limit the impact caused by adopting new versions. The WSF is a system that may include one or more servers, one or more processors, one or more databases, etc., in addition to various computer code, logic, etc.

In a large organization, web service versioning is processed in a decentralized manner within quite independent sub-organizations. Each sub-organization may either introduce a new web service or introduce a new web service version that is based on an existing version, which is called a baseline-namespace. Since the baseline-namespace is evolved independently by a different sub-organization, eventually that sub-organization may also introduce a new version for the baseline-namespace. Potentially, this will lead to having inconsistent evolution for the same web service.

The WSF platform tooling (validation tool and versioning analyzer tool) tracks the versioning history of all web services across all sub-organizations and it enables (and may enforce) reconciliation and synchronization among the distinguished web service versioning sequences implemented in a decentralized manner by the various sub-organizations.

Since for the same web service there may be multiple versions scattered in multiple sub-organizations, it is important to determine the latest dependencies to adopt in a new web service version and the baseline-namespace to use as a starting point for a new web service version.

The WSF platform tooling (validation tool and versioning analyzer tool) provide guidance and rules for users to choose the right dependencies and baseline-namespace such that consistency of the versioning history of all web services across all sub-organizations is enabled (and enforced).

The WSF platform offers a framework that supports modeling of high quality XML schemas and WSDLs. The WSF framework described herein has four main parts: WSF metadata; file generation tools; analysis tools; and a web service blueprint repository.

WSF metadata is comprised of Java data types, package-info files, WSF custom annotations and standard Java/JAXB/JAX-WS annotations. Each Java package uniquely identifies a namespace and XML schema file that is generated using WSF tooling. Each Java package, which contains JAX-WS endpoint interface, uniquely identifies a namespace, XML schema file and WSDL file that are generated using WSF tooling.

The file generation tools accept as input WSF metadata and generates artifacts [for example, WSDL generation tool, XSD generation tool, HTML documentation generation tool, and WSF WSDL/XSD importer (generates Java skeleton artifacts for endpoints)].

The analysis tools accept as input WSF metadata and generate reports (e.g. the validation tool and versioning analyzer tool). In one embodiment, the validation tool, which is a design-time governance tool, may implement around 200 validation rules that process and validate the WSF metadata to ensure adherence to WSF standards in these main areas: message assembly [the XML type used for service payload does not exceed the allowed depth, max number of (predicted) elements, that references are implemented in a way to prevent data duplication and cyclic relations, etc.]; alignment with a well-defined common information model; use of a closed set of fundamental types; dependency schemes [e.g. ensure the dependencies among the packages (and therefore among the XML/WSDL schemas as well) are relaxed to refrain from ripple effect when implementing a new version of XML schema]; faults (e.g. ensure the faults are defined according to WSF best practices); and versioning (e.g. ensure XML schemas are properly versioned, for example, the version is properly encoded into the namespace syntax used by the WSF platform, or to ensure a schema X of version n has no dependency on schema X version y, etc.).

The versioning analyzer tool presents the dependencies and versions of all namespaces implemented in the WSF. The versioning analyzer tool also provides the user with recommendations for implementing new versions based on that analysis. The versioning analyzer tool shows discrepancies in respect to versioning (e.g. stale dependencies on old namespaces' versions). The versioning analyzer tool also presents impact analysis based on simulated new namespaces' versions provided by the user to guide the user, which namespaces may adopt the new namespaces' versions.

The web service blueprint repository is a central, shared storage on the file system that is used to maintain the WSF metadata, WSDLs, XSDs and the related HTML documentation. In one embodiment, the WSF tools read/write WSF metadata/WSDLs/XSDs from this repository only.

Figure 2:
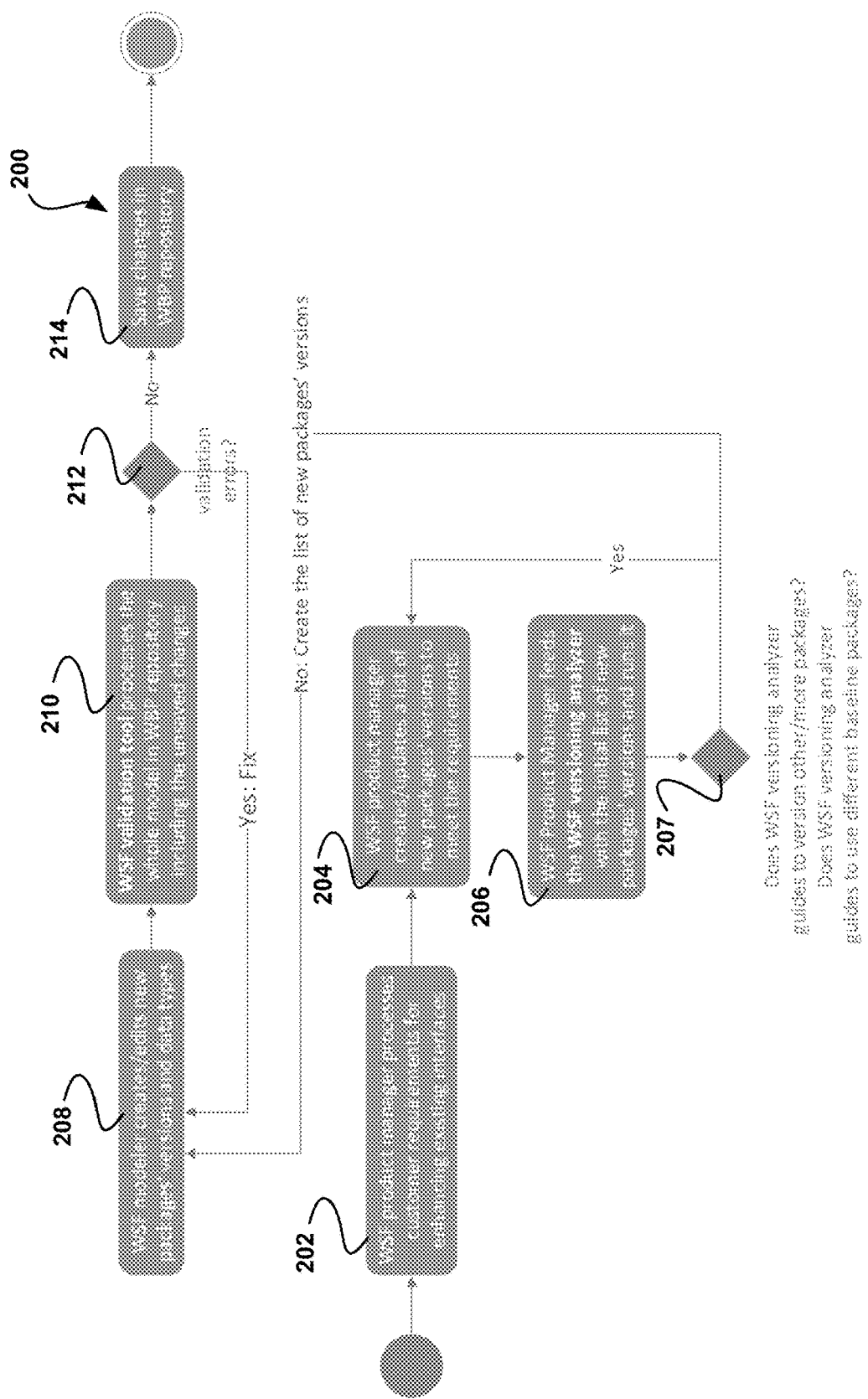
FIG. 2 illustrates a system flow showing a validation tool and versioning analyzer common use case, in accordance with one embodiment.

FIG. 2 illustrates a system flow 200 showing a validation tool and versioning analyzer common use case, in accordance with one embodiment. As an option, the system flow 200 may be implemented in the context of the details of FIG. 1. Of course, however, the system flow 200 may be implemented in the context of any desired environment. Further, the aforementioned definitions may equally apply to the description below.

The WSF methodology guides the users as to what changes do not require a new version. The WSF guidelines of what changes require the introduction of new namespace versions include: the addition of new operations to an existing endpoint and/or the addition of new data types to an existing namespace, which are the only changes allowed to be implemented into existing namespaces.

Any other kind of change must be implemented into a new version. The WSF platform supports multiple versions of any given namespace. Therefore, customers are not required to immediately adopt new versions upon their introduction. The framework does not enforce these guidelines.

The WSF Java metadata and subsequently the WSF web service artifacts, include version identifiers and unambiguous baseline version identification.

As shown in operation 202, the WSF product manager processes customer requirements for enhancing existing interfaces. In operation 204, the WSF product manager creates/updates a list of new packages' versions to meet the requirements. In operation 206, the WSF product manager feeds the WSF versioning analyzing with the initial list of new packages' versions and runs it. In decision 207, it is determined whether the WSF versioning analyzer guides to version other/more packages or guides to use different baseline packages. When it is determined in decision 207 that the WSF versioning analyzer guides to version other/more packages or guides to use different baseline packages, the flow 200 returns to operation 204. Otherwise, the flow 200 proceeds to operation 208 where the WSF modeler creates/edits new packages' versions and data types. In operation 210, the WSF validation tool processes the whole model in WBP repository including the unsaved changes. In decision 212, it is determined whether there are validation errors. When it is determined in decision 212 that there are validation errors, the flow 200 returns to operation 208. When it is determined in decision 212 that there are no validation errors, the flow 200 proceeds to operation 214 where the changes are saved in the WBP repository.

Figure 3:
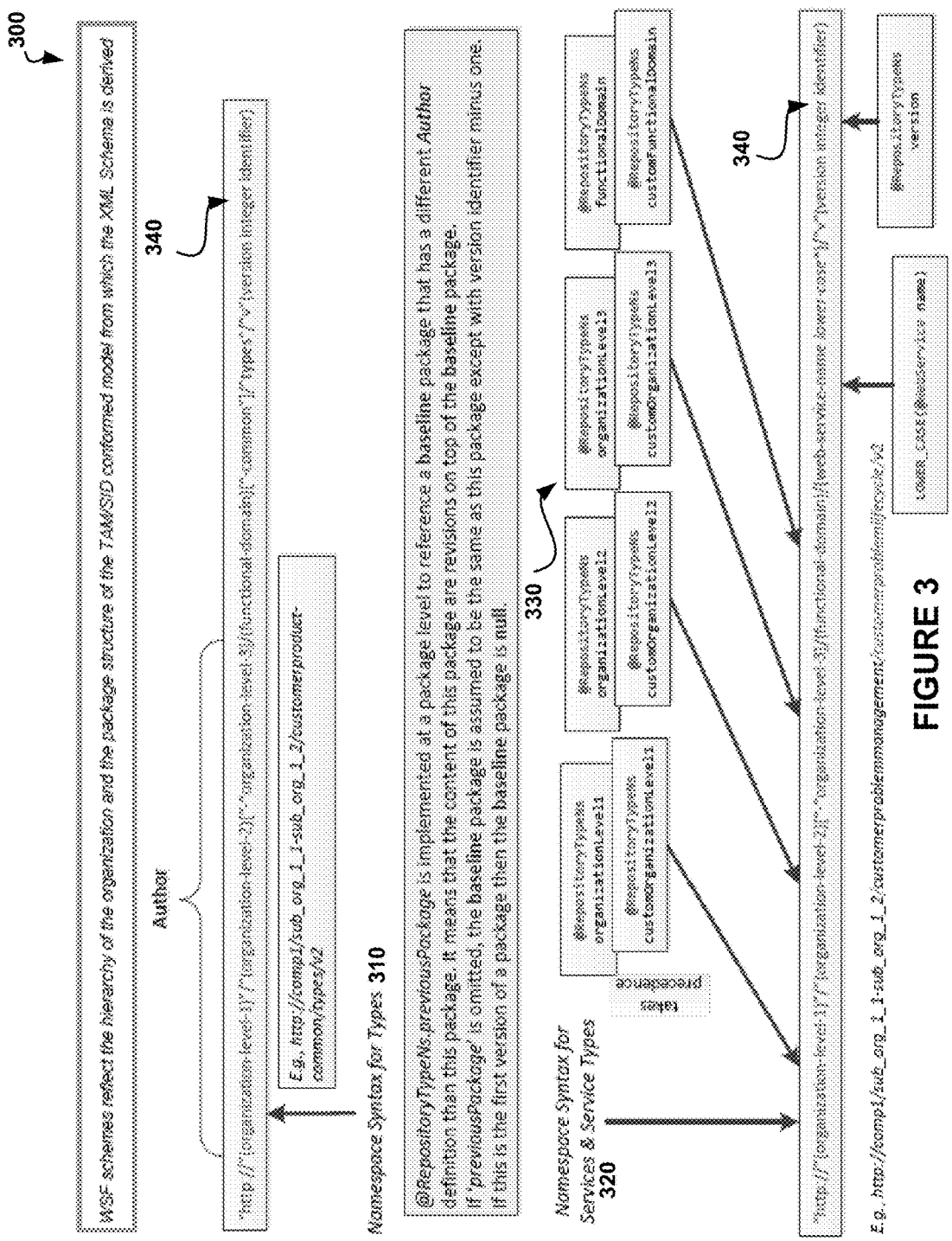
FIG. 3 illustrates an example of WSDL/XSD namespace syntax and concepts, in accordance with one embodiment.

FIG. 3 illustrates an example 300 of WSDL/XSD namespace syntax and concepts, in accordance with one embodiment. As an option, the example 300 may be viewed in the context of the details of the previous figures. Of course, however, the example 300 may be viewed in the context of any desired environment. Further, the aforementioned definitions may equally apply to the description below.

FIG. 3 shows the anatomy of a WSF platform namespace 310, 320 and how it maps to WSF Java metadata 330. More specifically, FIG. 3 shows how the version identifier 340 is encoded in the WSDL/XSD namespace. Similarly, syntax is defined for the filenames, but plays no role in the versioning solution.

FIG. 4 illustrates an example 400 of Java metadata package information, in accordance with one embodiment. As an option, the example 400 may be viewed in the context of the details of the previous figures. Of course, however, the example 400 may be viewed in the context of any desired environment. Further, the aforementioned definitions may equally apply to the description below.

Figure 5:
FIG. 5 illustrates an example of XML schema namespace definition, in accordance with one embodiment.

FIG. 4 presents an example of a package-info file and metadata (including the version identifier) from which the namespace is generated as shown in FIG. 5.

FIG. 5 illustrates an example 500 of XML schema namespace definition, in accordance with one embodiment. As an option, the example 500 may be viewed in the context of the details of the previous figures. Of course, however, the example 500 may be viewed in the context of any desired environment. Further, the aforementioned definitions may equally apply to the description below.

With respect to design-time governance, the WSF validation tool ensures compliancy with a set of versioning rules. With respect to the dependency scheme, the software package metrics of the platform define measurable values with a formula for computing the quality of packages' dependencies. The WSF platform makes use of concrete data types mostly. Thus, in order to allow changes to be implemented at a package level with less impact, the Afferent Couplings (Ca) metric has to be brought to the minimum and by that get the metric Distance from the Main Sequence (D) closer to 1, which is ideal.

FIG. 6 illustrates an example 600 of a dependency scheme, in accordance with one embodiment. As an option, the example 600 may be viewed in the context of the details of the previous figures. Of course, however, the example 600 may be viewed in the context of any desired environment. Further, the aforementioned definitions may equally apply to the description below.

The WSF dependency scheme that is presented in FIG. 6 defines the allowed dependencies among packages based on the WSF classifications for packages. This scheme guarantees there are no Package Dependency Cycles and that the Afferent Couplings (Ca) metric is kept low.

Dependencies are expressed at package level but calculated based on dependencies at class level.

Package A is claimed to have a dependency on Package B if one of these conditions is met: @XmlSeeAlso is present in a class of Package A and at least one class in the list of classes' names specified by the @XmlSeeAlso.value is of Package B; a class from Package A extends a class from Package B; a class from Package A has a field of type bType of Package B; or @WebFault is present in class of Package A and the class name specified by the @WebFault.faultBean is of Package B.

This is not an inclusive list of conditions. The list includes only the conditions relevant for versioning of web services and XML schemas.

The WSF validation tool implements many validation rules to enforce WSF best practices, which may evolve over time. Specifically, for versioning, it enforces: a dependency scheme (e.g. analyzes the dependencies and generates errors if the dependency scheme is violated); and limits concurrency of namespace versions. With respect to limiting concurrency of namespace versions, only packages from class SERVICE are allowed to have dependencies on two different versions of any given namespace and packages from other classes are not allowed to have dependency on more than one version of any given namespace. Additionally, a namespace cannot have a dependency on a different version of the current namespace.

Further, for versioning, the WSF validation tool enforces namespace version traceability and continuity. In this case, if a namespace has no predecessor baseline namespace and there is another namespace of a different author that also has no predecessor and it uses the same functional domain, a validation error will be generated since functional-domains expects to have continuity across authors (one has to be used as the baseline of the other).

In addition, for versioning, the WSF validation tool enforces namespace version layering. In this case, different authors are organized in layers and these layers are determined by the versioning sequence level. Within each layer there can be multiple versioning sequences, which are by definition completely independent. The layering is enforced by ensuring that all namespaces, which have a baseline of a different author, have a higher versioning sequence level than their baseline namespace.

Figure 7:
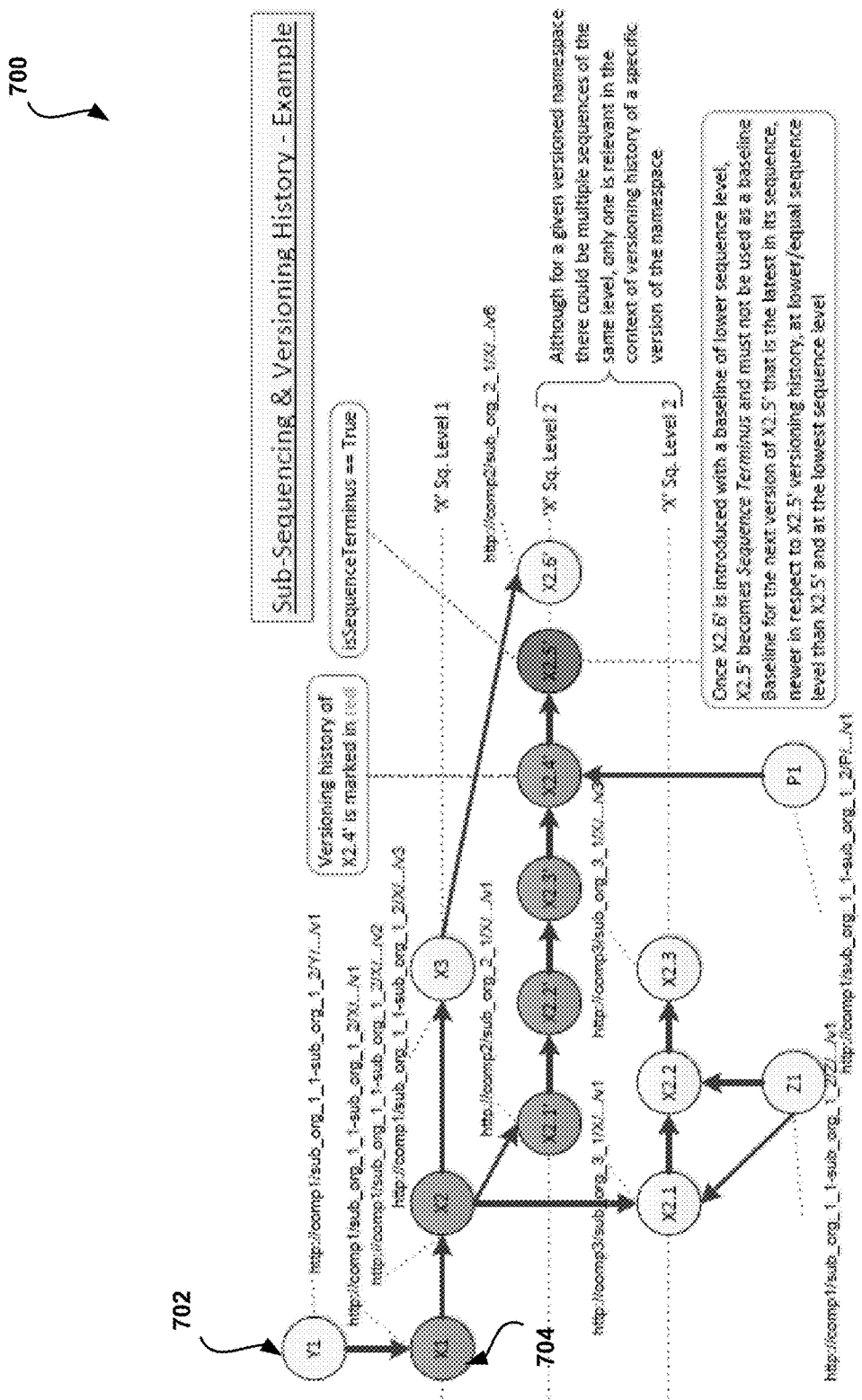
FIG. 7 illustrates an example of a versioning sequence and versioning history, in accordance with one embodiment.

FIG. 7 illustrates an example 700 of a versioning sequence and versioning history, in accordance with one embodiment. As an option, the example 700 may be viewed in the context of the details of the previous figures. Of course, however, the example 700 may be viewed in the context of any desired environment. Further, the aforementioned definitions may equally apply to the description below.

The WSF versioning analyzer advises a modeler/designer by analyzing the impact of new namespaces' versions so they can be implemented and adopted correctly. It is used to support the planning of namespace(s) versioning and offer guided versioning.

The designer may use the versioning analyzer iteratively to simulate and report the potential impact of introducing new namespace versions. The tool is also used to report the current state of versions' utilization and will indicate discrepancies such as namespace X depends on a version of namespace Y, which is not the latest.

In operation, the user of the tool provides two input files: a file (ver-list-file) that list pairs of namespaces, where for each pair the user specifies the a new namespace version ("explicit namespaces") and a user preferred baseline namespace; and a file (ns-esc-list-file) that lists namespaces for which the user does not want the tool to simulate the creation of new versions ("implicit namespaces"), even if those namespaces depend on namespaces that are being versioned (users know what namespaces are going to adopt a certain change). This helps the user to visualize more realistic view of the impact.

In some cases, users may rather make use of the "intact" hints only on subsequent executions of the tool and not on the first execution because the entire impact is not necessarily visible to them before running the tool. An "intact" hint refers to a namespace listed in the file that lists namespaces for which the user does not want the tool to simulate the creation of new versions (e.g. the "ns-esc-list-file" file).

The WSF versioning analyzer generally operates in two phases. For phase one, the WSF versioning analyzer tool computes an in-memory directed graph structure by using the adjacency list. The steps of Table 1 describe the process.

TABLE 1

Phase I:

1. If any of the listed namespaces in ver-list-file references a baseline namespace that does not exist in WBP repository or if any of the listed namespaces in ver-list-file already exists in WBP repository - abort with error
2. For each new namespace specified in the ver-list-file - let Q be the set containing pairs of {baseline-namespace, new-namespace}
3. Find for each new-namespace, based on the versioning history of the baseline-namespace, the latest version in each sequence level lower/equal to the sequence level of the baseline-namespace - if found a newer version TABLE 1-continued Phase I:

a. If within lower sequence level than the level of the baseline-namespace of the new-namespace, advise to use the namespace with the latest version and of the lowest sequence level - as the baseline-namespace
    b. If within the very same sequence as the baseline-namespace of the new-namespace, advise to use the latest version as the baseline-namespace and abort with error
4. Build a graph G that contains all existing latest versions' namespaces and their dependencies, when every vertex node represents a namespace and edge represents a direct dependency.
5. Vertices for new namespaces are created and added to G
6. Create vertices for implicit new-namespaces
    a. Let P be a set with all the vertices in G with no 'intact' indicator, not new-namespaces, not versioning sequence terminus, latest in their sequence level and have dependencies on a baseline- namespace in Q - if there is none, exit step #6.
    b. For each Vertex X in P, create a new implicit-namespace Vertex version Y 702 with version {X.version + 1} 704 if the authors of X and the corresponding new-namespace in Q are equal, otherwise compute a namespace for Y based on the author of the corresponding new-namespace in Q, if a new-namespace exists update its dependee and skip, if the sequence level does not exist set Y's version to be 1. Calculating its baseline following this logic:
        i. Given the versioning history of X, check if there is a newer version in lower sequence level than X, if yes, pick the one that is of latest version and in lowest sequence level - set X to be versioning sequence terminus
        ii. If not, X is used as baseline for Y
    The dependees of Y is based on the dependees of its baseline-namespace updated with the new-namespace in Q for which we created Y. Add Y to the graph.
    c. Re-initialize Q such that it only contains a pair of (implicit-new-namespace-baseline, implicit-new-namespace) for each new-namespace vertex that was created in (b). Go to (a)
7. Compute dependencies for new-namespaces & implicit-new-namespaces in G:
For each Vertex Y of a new-namespace, dependees are upgraded such that if the dependency can use the author of Y and the later version in the versioning sequence level is indeed the newest, use it - otherwise, upgrade to the latest version of the existing versioning-sequence level.
8. If any of the listed namespaces in ver-list-file is invalid given the baseline-namespace and per WBP validation rules - abort with error For phase two, given the graph G that was created in phase one, the WSF versioning analyzer may compute various KPIs for the report (FIG. 8 illustrates the format of the report, in accordance with one embodiment). Table 2 shows an algorithm for performing tasks associated with phase two.

TABLE 2

1. Alert for namespaces of latest versions in each versioning sequence level directly depending on namespaces that are not the latest versions according to both their versioning history and their current versioning sequence level.
Iterating over all dependencies of these namespaces:
    i. If for the current dependee there are newer versions of namespaces with related versioning history in lower versioning sequence level, advises that the depender namespace adopt the namespace T, which is in lowest versioning sequence level and of latest version in its versioning sequence family, replacing the current dependee. Add T to the new set R.
    ii. For the current dependee namespace determine if namespace T exists with the following properties:
        A) T shares the same author as the depender
        B) T is in a higher/equal versioning sequence level than/as the current dependee
        C) A namespace in T's versioning history and a namespace in the versioning history of the current dependee - share the

TABLE 2-continued same versioning sequence family.
    Among those namespaces complying with A, B and C - let T be the one in the lowest versioning sequence level and of latest version in its versioning sequence family, i.e.:
    Among those namespaces, the candidate set, complying with A, B and C determine T by the following two-phase process:
      1) Iterate over the candidate set adding to a new temporary set P. Before adding the entry to P check if any namespace currently in P is of a lower versioning sequence level. If there is a namespace entry in P of a lower versioning sequence level then do not add the new candidate. If the versioning sequence level of the new entry is lower than any existing entry then evict all such members from P.
      2) T is the entry in the set P with the latest version in its versioning sequence family.
    If such a T namespace exists and it does not exist in the set R then advises T replace the current dependee and add T to the set R.
  iii.  If the dependee is not the newest namespace in its versioning sequence family, advise that the depender namespace should adopt the latest namespace if it is not already in R and add this namespace to the set R.
  iv.  If per the versioning history of the dependee namespace there is a newer version at a lower versioning sequence level - advise that the depender namespace should adopt a newly created dependee namespace based on the author of the depender, that its baseline-namespace is the latest, newer version and at the lowest versioning sequence level
2.  Report for each latest namespace in each versioning-sequence level - its direct dependee namespaces
3.  Report all new-namespaces and their recursive impact in form of new-namespaces to be created indicating their baseline-namespaces FIG. 8 illustrates an example 800 of a versioning analyzer report, in accordance with one embodiment. As an option, the example 800 may be viewed in the context of the details of the previous figures. Of course, however, the example 800 may be viewed in the context of any desired environment. Further, the aforementioned definitions may equally apply to the description below.

In the context of the description herein, versioning history refers to a linear list of packages (/namespaces) traverse starting from this package backward all the way through the baseline packages recursively until it gets to the first package.

The versioning history of one namespace is considered to be related to the versioning history of another namespace if the two namespaces intersect by a namespace exist in their versioning history.

Versioning Sequence Family consists of namespaces that differ only by their version identifier. The Versioning Sequence Family may contain one or more versioning sequences that are separated by Versioning Sequence Terminus(es).

A versioning sequence refers to a list of namespaces sharing the same author and functional domain attributes, and their version identifiers comprise a complete sequence of integers starting from '1'. Except for the namespace with the smallest version number, the baseline of all namespaces within the same versioning sequence is the namespace with their version minus one.

A versioning sequence level refers to a positive integer. A versioning sequence in which none of its namespaces reference a baseline namespace of a different author is set to '1'. The level of any other versioning sequence of a namespace is calculated as the number of baseline namespaces of a unique author found while traversing the versioning history of this namespace plus one.

With respect to a versioning sequence terminus, a namespace X is considered as such if by incrementing the namespace version identifier by one the result is an existing namespace Y that its baseline namespace is other than X. In this case, Y is initiating another versioning sequence with no dependency on the sequence versioning of X and the versioning sequence of X can no longer be extended with more namespaces.

With respect to package classification, for each package (/namespace) an unambiguous classification is implemented via the @RepositoryTypeNs.category. These are the classifications available: CORE (a package that contains commonly used data types, which are not tight to any business domain); FUNCTIONAL DOMAIN COMMON (the package contains commonly used data types, which belong to a specific functional domain); FUNCTIONAL DOMAIN (the package contains data types, which belong to a specific functional domain); and SERVICE (the package contains data types, which pertain to a specific service only).

Figure 9:
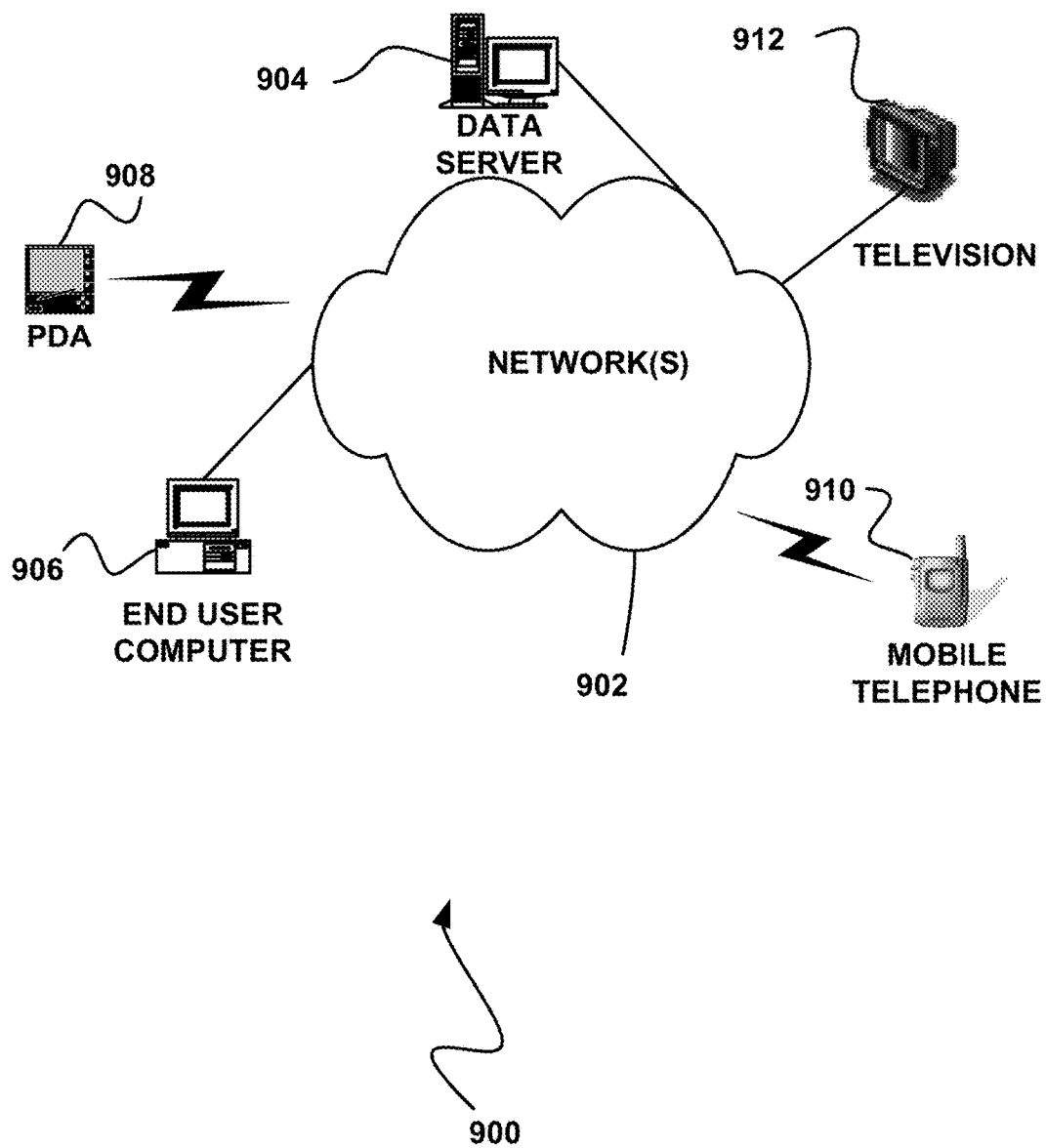
FIG. 9 illustrates a network architecture, in accordance with one possible embodiment.

FIG. 9 illustrates a network architecture 900, in accordance with one possible embodiment. As shown, at least one network 902 is provided. In the context of the present network architecture 900, the network 902 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 902 may be provided.

Coupled to the network 902 is a plurality of devices. For example, a server computer 904 and an end user computer 906 may be coupled to the network 902 for communication purposes. Such end user computer 906 may include a desktop computer, lap-top computer, and/or any other type of logic. Still yet, various other devices may be coupled to the network 902 including a personal digital assistant (PDA) device 908, a mobile phone device 910, a television 912, etc.

Figure 10:
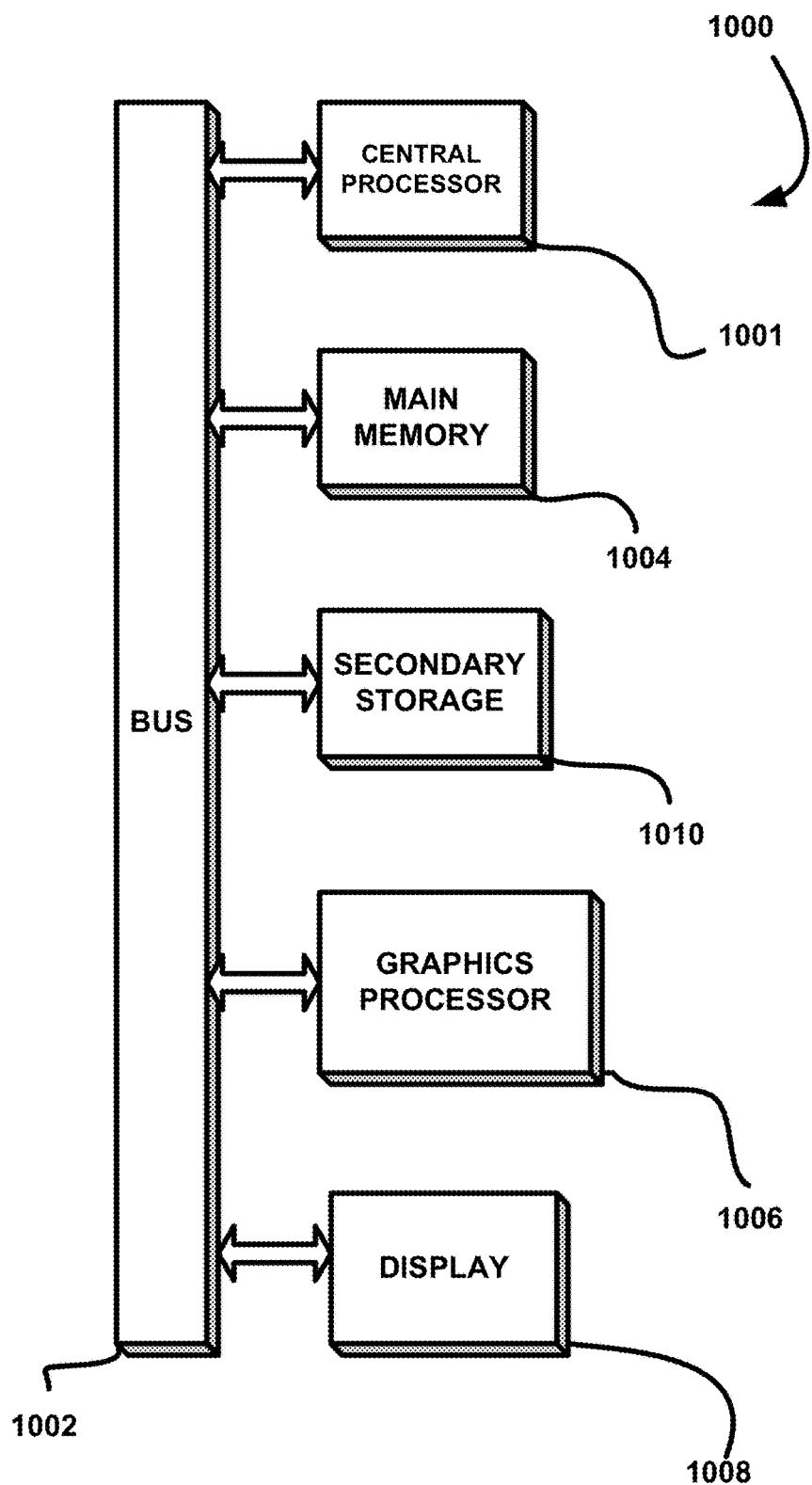
FIG. 10 illustrates an exemplary system, in accordance with one embodiment.

FIG. 10 illustrates an exemplary system 1000, in accordance with one embodiment. As an option, the system 1000 may be implemented in the context of any of the devices of the network architecture 900 of FIG. 9. Of course, the system 1000 may be implemented in any desired environment.

As shown, a system 1000 is provided including at least one central processor 1001 which is connected to a communication bus 1002. The system 1000 also includes main memory 1004 [e.g. random access memory (RAM), etc.]. The system 1000 also includes a graphics processor 1006 and a display 1008.

The system 1000 may also include a secondary storage 1010. The secondary storage 1010 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 1004, the secondary storage 1010, and/or any other memory, for that matter. Such computer programs, when executed, enable the system 1000 to perform various functions (as set forth above, for example). Memory 1004, storage 1010 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A computer program product embodied on a non-transitory computer readable medium, comprising computer code for:
tracking, by a system, a versioning history of a plurality of web services of a plurality of sub-organizations associated with an organization, including building a directed graph having:
a plurality of vertex nodes, each vertex node of the plurality of vertex nodes representing a different namespace of a plurality of namespaces associated with available versions of the plurality of web services, and a plurality of edges connecting the plurality of vertex nodes, each edge of the plurality of edges representing a dependency between two namespaces of the plurality of namespaces;

identifying, by the system, a new version of a web service to be introduced in at least one of the sub-organizations of the plurality of sub-organizations;

automatically identifying, by the system, a baseline web service version to use for the new version of the web service based on the tracked versioning history of the web service, including:

selecting, by the system from the directed graph, the baseline web service version from the plurality of namespaces;

determining, by the system from the directed graph, dependencies associated with the baseline web service version;

validating, by the system, an existing state of WSDL (Web Services Definition Language) documents and XSD (XML Schema Definition) documents to ensure compliance with a dependency scheme associated with the tracked versioning history of the web service; and recommending, by the system, the selected baseline web service version and the determined dependencies to use for the new version of the web service including displaying, by the system, at least one recommendation for the selected baseline web service version and the determined dependencies utilizing at least one user interface, and indicating an impact of introducing the new version of the web service, such that consistency of the tracked versioning history of the plurality of web services across the plurality of sub-organizations is capable of being maintained.

2. The computer program product of claim 1, wherein the new version of the web service is associated with updated WSDL schema.

3. The computer program product of claim 1, wherein the new version of the web service is associated with updated XML (Extensible Markup Language) schema.

4. The computer program product of claim 1, wherein the plurality of sub-organizations associated with the organization include a plurality of separate decentralized sub-organizations.

5. The computer program product of claim 1, wherein a version identifier is associated with each namespace of the plurality of namespaces.

6. A method, comprising:

tracking, by a system, a versioning history of a plurality of web services of a plurality of sub-organizations associated with an organization, including building a directed graph having:

a plurality of vertex nodes, each vertex node of the plurality of vertex nodes representing a different namespace of a plurality of namespaces associated with available versions of the plurality of web services, and a plurality of edges connecting the plurality of vertex nodes, each edge of the plurality of edges representing a dependency between two namespaces of the plurality of namespaces;

identifying, by the system, a new version of a web service to be introduced in at least one of the sub-organizations of the plurality of sub-organizations;

automatically identifying, by the system, a baseline web service version to use for the new version of the web service based on the tracked versioning history of the web service, including:

selecting, by the system from the directed graph, the baseline web service version from the plurality of namespaces;

determining, by the system from the directed graph, dependencies associated with the baseline web service version;

validating, by the system, an existing state of WSDL (Web Services Definition Language) documents and XSD (XML Schema Definition) documents to ensure compliance with a dependency scheme associated with the tracked versioning history of the web service; and recommending, by the system, the selected baseline web service version and the determined dependencies to use for the new version of the web service including displaying, by the system, at least one recommendation for the selected baseline web service version and the determined dependencies utilizing at least one user interface, and indicating an impact of introducing the new version of the web service, such that consistency of the tracked versioning history of the plurality of web services across the plurality of sub-organizations is capable of being maintained.

7. The method of claim 6, wherein the new version of the web service is associated with updated WSDL schema.

8. The method of claim 6, wherein the new version of the web service is associated with updated XML (Extensible Markup Language) schema.

9. The method of claim 6, wherein the plurality of sub-organizations associated with the organization include a plurality of separate decentralized sub-organizations.

10. The method of claim 6, wherein a version identifier is associated with each namespace of the plurality of namespaces.

11. A system comprising:

a memory system; and one or more processing cores coupled to the memory system and that are each configured for:

tracking, by the system, a versioning history of a plurality of web services of a plurality of sub-organizations associated with an organization, including building a directed graph having:

a plurality of vertex nodes, each vertex node of the plurality of vertex nodes representing a different namespace of a plurality of namespaces associated with available versions of the plurality of web services, and a plurality of edges connecting the plurality of vertex nodes, each edge of the plurality of edges representing a dependency between two namespaces of the plurality of namespaces;

identifying, by the system, a new version of a web service to be introduced in at least one of the sub-organizations of the plurality of sub-organizations;

automatically identifying, by the system, a baseline web service version to use for the new version of the web service based on the tracked versioning history of the web service, including:

selecting, by the system from the directed graph, the baseline web service version from the plurality of namespaces;

determining, by the system from the directed graph, dependencies associated with the baseline web service version;

validating, by the system, an existing state of WSDL (Web Services Definition Language) documents and XSD (XML Schema Definition) documents to ensure compliance with a dependency scheme associated with the tracked versioning history of the web service; and recommending, by the system, the selected baseline web service version and the determined dependencies to use for the new version of the web service including displaying, by the system, at least one recommendation for the selected baseline web service version and the determined dependencies utilizing at least one user interface, and indicating an impact of introducing the new version of the web service, such that consistency of the tracked versioning history of the plurality of web services across the plurality of sub-organizations is capable of being maintained.

12. The system of claim 11, wherein the new version of the web service is associated with updated WSDL schema.

13. The system of claim 11, wherein the new version of the web service is associated with updated XML (Extensible Markup Language) schema.

14. The system of claim 11, wherein the plurality of sub-organizations associated with the organization include a plurality of separate decentralized sub-organizations.

15. The system of claim 11, wherein a version identifier is associated with each namespace of the plurality of namespaces.

\* \* \* \* \*